United States Patent [19]

Maruyama

[11] Patent Number: 5,410,594

[45] Date of Patent: Apr. 25, 1995

[54] TRANSMISSION INPUT/OUTPUT DEVICE WITH REDUCED POWER CONSUMPTION

[75] Inventor: Ryoji Maruyama, Saitama, Japan

[73] Assignee: Kabushiki Kaisha Toshiba, Kawasaki, Japan

[21] Appl. No.: 662,208

[22] Filed: Feb. 28, 1991

[30] Foreign Application Priority Data

Mar. 2, 1990 [JP] Japan ................................ 2-049539

[51] Int. Cl.$^6$ ............................................. H04B 3/03
[52] U.S. Cl. ................................... 379/398; 379/413; 379/344; 379/338; 379/402; 379/403
[58] Field of Search ............... 379/398, 399, 400, 338, 379/341, 342, 340, 344, 413, 402

[56] References Cited

U.S. PATENT DOCUMENTS

| | | | |
|---|---|---|---|
| 4,004,102 | 1/1977 | Ott | 379/398 |
| 4,064,377 | 12/1977 | Regan | 379/342 |
| 4,359,609 | 11/1982 | Apfel | 379/398 |
| 4,567,331 | 1/1986 | Martin | 379/398 X |
| 4,604,741 | 8/1986 | Borsellotti | 379/400 X |
| 4,607,141 | 8/1986 | Schorr | 379/398 |
| 4,609,781 | 9/1986 | Gay | 379/400 |
| 4,796,295 | 1/1989 | Gay et al. | 379/398 |
| 4,894,864 | 1/1990 | Cook | 379/340 |
| 4,914,693 | 4/1990 | Beck et al. | 379/398 X |

FOREIGN PATENT DOCUMENTS 1583212 10/1969 France .
2906084 8/1980 Germany .

OTHER PUBLICATIONS

Fully Integrated Analog Telephone, E. Moons et al, IEEE Journal of Solid–State Circuits 24 (1989) Jun., No. 3, New York, U.S., pp. 681–685.

*Primary Examiner*—James L. Dwyer
*Assistant Examiner*—Magdy W. Shehata
*Attorney, Agent, or Firm*—Foley & Lardner

[57] ABSTRACT

A transmission input/output device for signal transmission through a telephone line, with reduced power consumption, size, and cost. The device includes: a resistor, connected to the telephone line, for setting a signal input and output impedance; and a transmission control circuit for amplifying the transmission signals to be outputted to the telephone line, including: a variable resistor, connected in series with the resistor, for supplying voltages corresponding to the transmission signals to be outputted to the telephone line into the resistor according to changes of an impedance of the variable resistor; and an operational amplifier for controlling the changes of the impedance of the variable resistor by supplying an output according to the transmission signals to be outputted to the variable resistor.

7 Claims, 3 Drawing Sheets

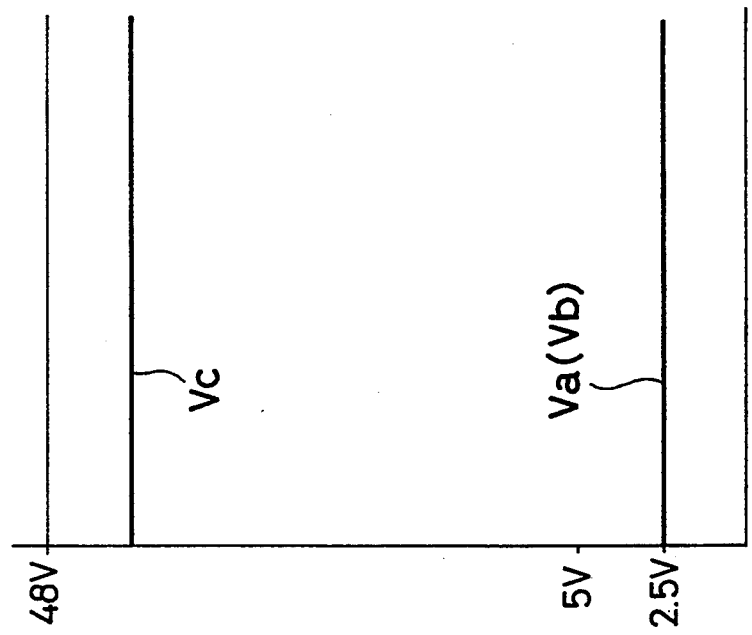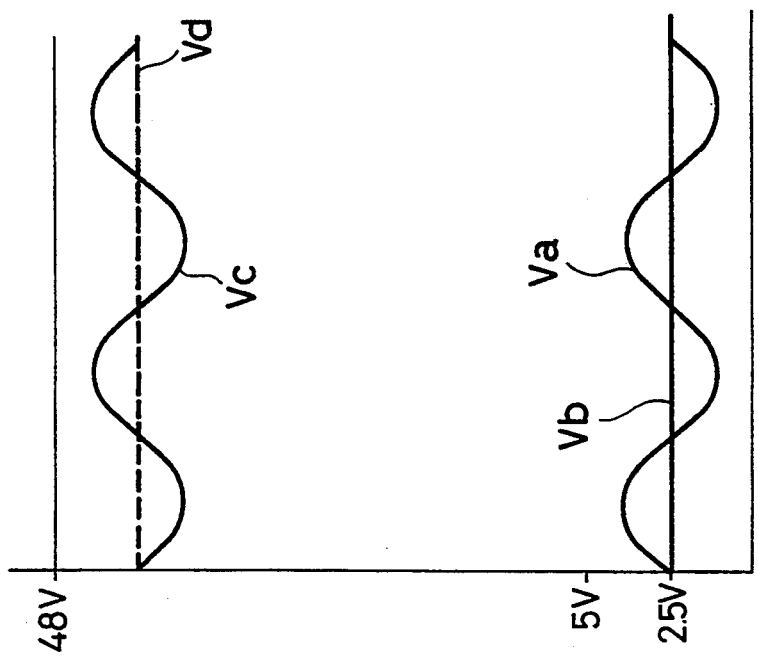

TRANSMISSION INPUT/OUTPUT DEVICE WITH REDUCED POWER CONSUMPTION

BACKGROUND OF THE INVENTION

1. Field of the Invention

The present invention relates to a transmission input/output device for a signal transmission between transmission terminals through a telephone line either in a state of picking up the telephone line or not picking up the telephone line.

2. Description of the Background Art

An example of a conventional transmission input/output device is shown in FIG. 1, where terminals T1 and T2 are connected to the telephone line, and a primary coil of a transformer 51 and a resistor 53 are connected in series between the terminals T1 and T2, while a secondary coil of the transformer 51 is connected to a transmitter circuit 59 through a resistor 55 and an amplifier 57 as well as to a receiver circuit 63 through the resistor 55 and a differential amplifier 61.

The amplifier 57 comprises: an operational amplifier 65; a resistor 67 connected to an input line between the transmitter circuit 59 and an inverting input terminal of the operational amplifier 65; and a resistor 69 connected to a feedback line between the inverting input terminal and an output terminal of the operational amplifier 65.

The differential amplifier 61 comprises: an operational amplifier 77; a resistor 71 connected to an input line between an inverting input terminal of the operational amplifier 77 and the resistor 55; a resistor 73 connected to another input line between the transformer 51 and a non-inverting input terminal of the operational amplifier 77; a resistor 75 connected to a feedback line between the inverting input terminal and an output terminal of the operational amplifier 77; and a resistor 79 connected to the non-inverting input terminal of the operational amplifier 77.

The transformer 51 possesses a high impedance of approximately 600 D with respect to the alternating current, and a low impedance with respect to the direct current. The resistor 53 connected in series with the primary coil of the transformer 51 determines the direct current impedance for the telephone line. The resistor 55 connected to the secondary coil side of the transformer 51 is selected to be 600 Ω, for example, in order to take an impedance matching in the case of transmission signal reception.

In such a conventional transmission input/output device, the transmission signals to be transmitted through the telephone line are outputted from the transmitter circuit 59, amplified by the amplifier 57, and transmitted onto the telephone line through the transformer 51, while the transmission signals to be received through the telephone line are supplied to the differential amplifier 61 through the transformer 51, amplified by the differential amplifier 61, and received by the receiver circuit 63.

Such a conventional transmission input/output device has been associated with problems that it has been difficult to reduce its size and cost because the transformer 51 is involved, and that the power source such as batteries of the transmission terminal circuit in which the transmission input/output device is incorporated have to be large because the current consumption by the amplifier 57 and the differential amplifier 61 is so large that the satisfactory operation may be hampered by the lack of amplitude of the transmisission signals in a case where the amplifier 57 and the differential amplifier 61 are operated at a low voltage of 3 or 5 V, as a consequence of the loss at the transformer 51.

SUMMARY OF THE INVENTION

It is therefore an object of the present invention to provide a transmission input/output device with reduced power consumption, size, and cost.

This object is achieved in the present invention by providing a transmission input/output device for outputting and inputting transmission signals transmitted through a telephone line, comprising: resistor means, connected to the telephone line, for setting a signal input and output impedance; and transmission control circuit means for amplifying the transmission signals to be outputted to the telephone line, including: variable resistor means, connected in series with the resistor means, for supplying voltages corresponding to the transmission signals to be outputted to the telephone line into the resistor means according to changes of the impedance of the variable resistor means; and operational amplifier means for controlling the changes of the impedance of the variable resistor means by supplying an output according to the transmission signals to be outputted to the variable resistor means.

Other features and advantages of the present invention will become apparent from the following description taken in conjunction with the accompanying drawings.

BRIEF DESCRIPTION OF THE DRAWINGS

FIG. 3 is a voltage diagram for the transmission input/output device of FIG. 2 in the case of outputting transmission signals.

FIG. 4 is a voltage diagram for the transmission input/output device of FIG. 2 in the case of inputting transmission signals.

DETAILED DESCRIPTION OF THE PREFERRED EMBODIMENTS

Figure 1:
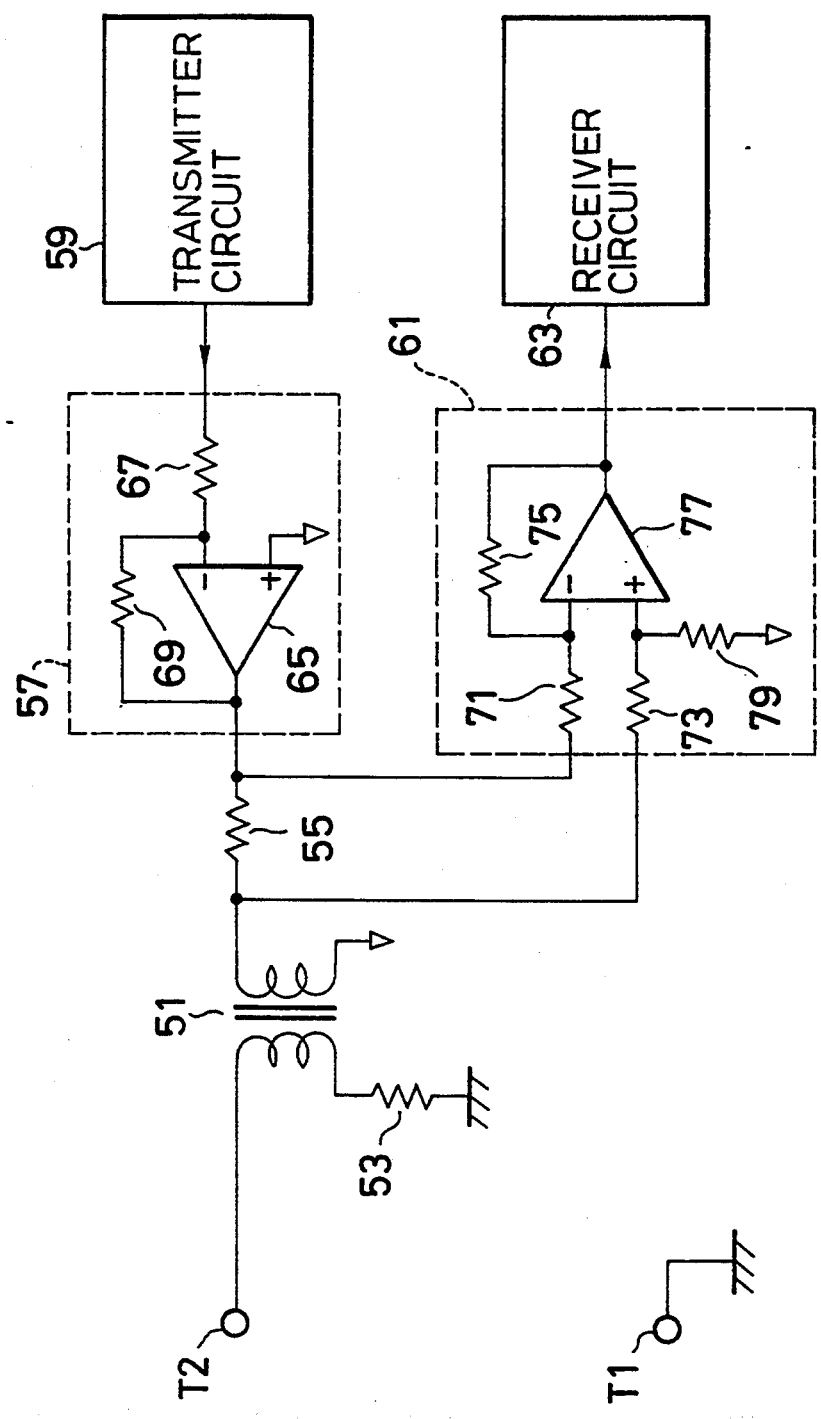
FIG. 1 is a block diagram of an example of a conventional transmission input/output device.
Figure 2:
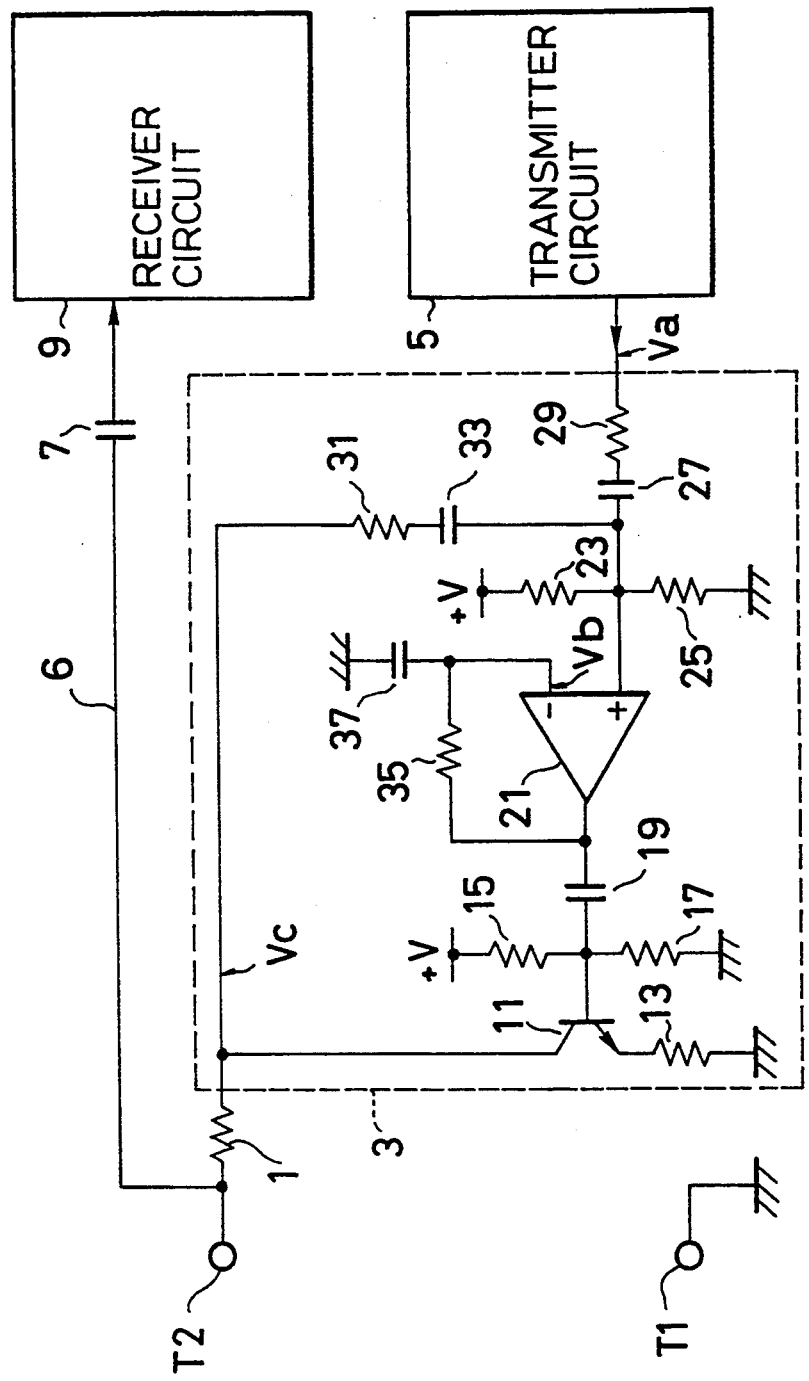
FIG. 2 is a block diagram of one embodiment of a transmission input/output device according to the present invention.

Referring now to FIG. 2, one embodiment of a transmission input/output device according to the present invention will be described in detail.

In this transmission input/output device, terminals T1 and T2 are connected to the telephone line, and the terminal T2 is connected with a transmitter circuit 5 for outputting transmission signals, through a resistor 1 and a transmission control circuit 3 which are connected in series, while a junction between the resistor 1 and the terminal T2 is also connected with a receiver circuit 9 for receiving the transmission signals, through a signal receiving line 6 having a capacitor 7 which provides the alternating voltage coupling between the terminal T2 and the receiver circuit 9.

The transmitter circuit 5 is a circuit such as a FSK (frequency shift keying) modulator or a DTMF (dual-tone multi-frequency) dialer capable of generating the transmission signals to be transmitted through the telephone line, while the receiver circuit 9 is a circuit such as a FSK demodulator or a DTMF receiver capable of receiving the transmission signals transmitted through the telephone line. The input impedance of the receiver circuit 9 is selected to be sufficiently larger than that of the resistor 1.

The resistor 1 determines an alternating current input and output impedance with respect to the transmission signals, and is preferably selected to be 600 Ω for a usual telephone line transmission.

The transmission control circuit 3 functions as a power amplifier in the case of outputting the transmission signals from the transmitter circuit 5, while determining the alternating current input impedance along with the resistor 1 in a case of receiving the transmission signals by the receiver circuit 9. In the latter case, the transmission control circuit 3 functions to maintain the alternating current input impedance at 600 Ω when the resistor 1 is selected to be 600 Ω.

As shown in FIG. 2, this transmission control circuit 3 comprises: a transistor 11 functioning as a variable resistor and a resistor 13 which are connected in series between the resistor 1 and the terminal T1; a voltage divider circuit formed by a resistors 15 and 17 connected between a constant +V voltage source and the ground, for providing a bias voltage to a base of the transistor 11; an operational amplifier 21 connected to the base of the transistor 11 through the voltage divider circuit and a capacitor 19, for supplying alternating current signals to drive the transistor 11 by controlling the change of the impedance of the transistor 11; a voltage divider circuit formed by resistors 23 and 25 connected between a constant V voltage source and the ground, for providing a bias voltage to a non-inverting input terminal of the operational amplifier 21; a capacitor 27 and a resistor 29 which are connected in series and which provides the alternating voltage coupling between the transmitter circuit 5 and the non-inverting input terminal of the operational amplifier 21; a resistor 31 and a capacitor 33 which are connected in series between the non-inverting input terminal of the operational amplifier 21 and a junction of the resistor 1 and the transistor 11; a resistor 35 connected between an inverting input terminal and an output terminal of the operational amplifier 21; and a capacitor 37 connected between the inverting input terminal of the operational amplifier 21 and the ground.

In this configuration, the transmission signals generated by the transmitter circuit 5 are fed to the non-inverting input terminal of the operational amplifier 21 through the resistor 29 and the capacitor 2 with the bias voltage given by the voltage divider circuit formed by the resistors 23 and 25, such that the transmission signals are amplified by the operational amplifier 21. The amplified output of the operational amplifier 21 is then fed to the base of the transistor 11 through the capacitor 19 with the bias voltage given by the voltage divider circuit formed by the resistors 15 and 17, such that the impedance of the variable resistor formed by the transistor 11 is controlled in accordance with the transmission signals generated by the transmitter circuit 5. The change of the impedance of the variable resistor formed by the transistor 11 produces signals Vc on a collector side of the transistor 11 determined by a voltage divider circuit configuration formed by a resistance between a collector and an emitter of the transistor 11, the resistor 13, and the impedance of the resistor 1 and the telephone line, which are then transmitted through the resistor 1 to the telephone line as the transmission signals.

Here, a direct bias level at the non-inverting input terminal of the operational amplifier 21 given by the voltage divider circuit formed by the resistors 23 and 25 because the resistor 29 and the capacitor 27 are providing the alternating voltage coupling. On the other hand, a direct bias level of the signals Vc at the junction of the resistor 1 and the transistor 11 is determined from an amplification factor $h_{FE}$ of the transistor 11, the resistors 13, 15, and 17, and the impedance of the resistor 1 and telephone line, so that this direct bias level can be selected by selecting the resistors 13, 15, and 17 appropriately.

Meanwhile, the transmission signals transmitted to the telephone line are fed back to the non-inverting input terminal of the operational amplifier 21 through the resistor 31 and the capacitor 33, such that this feed back controls the alternating current amplification factor of the operational amplifier 21 which is determined from a ratio of a sum of the impedances of the resistor 29 and the capacitor 27 with respect to a sum of the impedances of the resistor 31 and the capacitor 33.

In addition, the resistor 35 and the capacitor 37 forms a smoothing circuit for providing a negative feed back of only direct voltage component in the output of the operational amplifier 21 to the inverting input terminal of the operational amplifier 21, where a time constant for this smoothing circuit is predetermined appropriately such that the entire frequencies of the transmission signals from the transmitter circuit 5 can be smoothed sufficiently.

Referring now to FIGS. 3 and 4, an operation of this transmission input/output device will be described in detail. In the following, it is assumed that the transmitter circuit 5, the receiver circuit 9, and the operational amplifier 21 are operated by 5 V voltage from a power source, and the transmission signals from the transmitter circuit 5 are oscillating around 2.5 V as shown in FIG. 3 by a curve Va.

First, referring to FIG. 3, a case of outputting the transmission signals from the transmitter circuit 5 will be described.

In this case of outputting, the transmission signals Va generated by the transmitter circuit 5 are fed to the non-inverting input terminal of the operational amplifier 21 through the resistor 29 and the capacitor 27, and the operational amplifier 21 outputs the amplified output signals of the same wave form as the transmission signals Va. This amplified output signals of the operational amplifier 21 are smoothed by the smoothing circuit formed by the resistor 35 and the capacitor 37, such that a direct voltage Vb is provided as a feed back to the inverting input terminal of the operational amplifier 21, and that a balanced state of the operational amplifier 21 is realized.

The alternating voltage component of the amplified output signals of the operational amplifier 21 are then fed to the base of the transistor 11 through the capacitor 19, such that the impedance of the variable resistor formed by the transistor 11 is controlled to produce the signals Vc through the resistor 1 which are subsequently outputted to the telephone line as the transmission signals. In FIG. 3, a voltage Vd indicates a voltage at the terminal T2 in an absence of the transmission signals.

Here, the balanced state of the operational amplifier 21 is maintained because the alternating voltage component of the transmission signals outputted to the terminal T2 which has 180° inverted phase as a result of the transistor 11 is provided as a negative feed back to the inverting input terminal of the operational amplifier 21 through the resistor 31 and the capacitor 33.

Next, referring to FIG. 4, a case of inputting the transmission signals from the telephone line to the receiver circuit 9 will be described.

In this case of inputting, the transmitter circuit 5 feeds only a constant direct voltage Va, which is equal to the direct voltage Vb of FIG. 3, to the transmission control circuit 3, so that the operational amplifier 21 controls the transistor 11 to make the signals Vc to be a constant direct voltage. As a result, as far as the alternating voltage component is concerned, the transmission signals transmitted through the terminal T2 from the telephone line are terminated at the resistor 1 on the transmitter circuit 5 side, so that the received transmission signals are transmitted from the terminal T2 to the receiver circuit 9 through the signal receiving line 6 and the capacitor 7.

Thus, according to this transmission input/output device, the transmission signals are not merely superposed onto the telephone line by using a transformer as in the conventional transmission input/output device, but transmitted by utilizing the change of the impedance of the variable resistor formed by the transistor 11, so that the power consumption can be reduced and therefore the power source of the transmission terminal circuit in which the transmission input/output device is incorporated can be small. In other words, a low voltage power supply of only 3 or 5 V can be used to drive the circuit in obtaining the sufficient output amplitude. This implies that the small power source in the form of batteries provided for the other control circuit of a nearby system such as a micro-computer can be shared, without providing a separate power source for the transmission terminal circuit.

In addition, because no transformer is involved, the reduction of the size and cost of the circuit can also be achieved.

Such advantages of this transmission input/output device can be particularly useful in an application in which only a limited amount of power source is available as in a case of a so called terminal network control unit.

It is to be noted that, in this embodiment of the transmission input/output device, a constant input/output impedance of 600 Ω can be realized, so that this transmission input/output device can be applied to a signal transmission between transmission terminals through a telephone line either in a state of picking up the telephone line (i.e., connected by a low resistance) or not picking up the telephone line (i.e., connected by a high resistance).

It is also to be noted that other variable resistance elements such as a photo-coupler may be used instead of the transistor 11 in the above embodiment. Furthermore, instead of the alternating voltage component coupling utilizing the capacitor 27, a direct voltage component coupling may be used by omitting the capacitor 27 and the resistors 23 and 25. Moreover, the resistor 17 may be omitted by using the transistor 11 of a simplified bias.

Besides these, many modifications and variations of the above embodiment may be made without departing from the novel and advantageous features of the present invention. Accordingly, all such modifications and variations are intended to be included within the scope of the appended claims.

What is claimed is:

1. A transmission input/output device for outputting and inputting transmission signals transmitted through a telephone line, comprising:

resistor means, connected to the telephone line, for setting a signal input and output impedance; and transmission control circuit means for amplifying the transmission signals to be outputted to the telephone line, including:

variable resistor means, connected in series with the resistor means, for supplying voltages corresponding to the transmission signals to be outputted to the telephone line into the resistor means, said voltages varying as an impedance of the variable resistor means changes;

operational amplifier means, connected to the variable resistor means, for controlling the changes of the impedance of the variable resistor means according to the transmission signals; and a negative feed back loop for providing a negative feed back of the voltages supplied from the variable resistor means to the operational amplifier means.

2. The transmission input/output device of claim 1, wherein the transmission control circuit means further includes a smoothing circuit for providing a negative feed back to the operational amplifier means.

3. The transmission input/output device of claim 1, further comprising signal receiving means, connected to a junction between the telephone line and the resistor means, for receiving the transmission signals to be inputted from the telephone line.

4. The transmission input/output device of claim 3, wherein the operational amplifier means controls the changes of the impedance of the variable resistor means such that the voltages supplied from the variable resistor means become a constant direct voltage in a case of inputting the transmission signals from the telephone line.

5. The transmission input/output device of claim 1, wherein the variable resistor means comprises a transistor where a collector is connected with the resistor means and a gate is connected with an output terminal of the operational amplifier means, and an emitter.

6. The transmission input/output device of claim 1, further comprising a voltage divider circuit means for providing a bias voltage to a non-inverting input terminal of the operational amplifier means.

7. The transmission input/output device of claim 1, further comprising a voltage divider circuit means for providing a bias voltage to the variable resistor means.

* * * * *